Patented Jan. 11, 1944

2,338,805

UNITED STATES PATENT OFFICE 2,338,805

PRODUCTION OF ORGANIC COMPOUNDS

Henry Dreyfus, London, England, assignor to Celanese Corporation of America, a corporation of Delaware No Drawing. Application March 1, 1941, Serial No. 381,414. In Great Britain March 16, 1940

1 Claim. (Cl. 260—449.6)

This invention relates to the manufacture of organic compounds and is more particularly concerned with the production of valuable hydrocarbons by reacting carbon monoxide and hydrogen.

The reaction between carbon monoxide and hydrogen can be carried out so as to yield oxygenated organic compounds or hydrocarbons as the main products according to the catalysts employed. Whereas, however, the production of oxygenated compounds is usually effected with the aid of high pressures, valuable hydrocarbons can be obtained at normal atmospheric pressure, but the reaction in this case is one which is characterised by an extreme sensitivity to temperature and, in general, it is necessary, in order to produce any desired product, to hold the temperature constant within about 5° C., variations of more than this, and especially more than 10° C. producing serious effects upon the yields and nature of the products. Since the reaction is strongly exothermic the maintenance of the necessary rigid control of the temperature is a matter of extreme difficulty, and this is aggravated by the fact that for the production of the most valuable hydrocarbons, especially normally liquid hydrocarbons, which can be obtained by the process, the best temperatures to use with an active catalyst, e. g., cobalt, are below 200° C., for instance temperatures of the order of 180–200° C.

The use in the reaction zone of efficient heat transfer means, for instance tubes passing through the body of the apparatus and used for the circulation of a cooling liquid, while assisting in the maintenance of uniformity of reaction temperature, is not of itself sufficient to enable that degree of temperature control which is essential for attaining the most valuable results obtainable from the process.

According to the present invention the catalyst used in the process is employed upon a carrier or support which may be of relatively inert nature and the ratio of catalyst to carrier is less than 1:10, and is preferably much lower than this, for instance 1:20 to 1:30. A higher proportion of catalyst upon the carrier, for instance 1:5, while permitting the use of higher throughputs with a given apparatus and still effecting a considerable minimisation in temperature fluctuations, nevertheless permits small temperature fluctuations which are avoided by the use of the lower ratios indicated above with considerable benefit to the results obtained in the process.

The catalyst used depends naturally upon the products desired but, in general, the use of a cobalt or nickel catalyst, preferably activated by the addition of thoria or of another metal oxide, such as alumina, magnesia or zinc oxide, leads to the most satisfactory results with the low temperature range indicated, especially when traces of copper are present.

The carrier upon which the catalyst is deposited may be substantially inert, e. g., pumice, kieselguhr or asbestos, or may have a somewhat higher surface development as is the case with silica gel or charcoal. The catalyst may be applied to the carrier by moistening or impregnating the carrier with a solution of salts of the catalytic metals which are decomposed by heat to their oxides, e. g., nitrates, drying, heating and reducing the impregnated product. It is preferred to carry out the decomposition of the nitrates or other salts and also the subsequent reduction at as low a temperature as possible.

As previously indicated, the process is one which can be carried out at normal atmospheric pressure and, if desired, an even lower pressure, e. g., ½ or ¼ of an atmosphere may be employed. If desired, the partial pressure of the reactants may be reduced by using a diluent gas, e. g., nitrogen, carbon dioxide, steam or methane, or other hydro-carbon gases or vapours. Where it is desired to use a hydrocarbon as diluent this hydrocarbon may be a product of an earlier stage or operation involving the reaction of carbon monoxide and hydrogen. The quantity of diluent used may, in general, be equal to about the volume of the carbon monoxide and hydrogen mixture, although larger quantities of diluent, e. g., up to 5 or 10 parts by volume for each part of reactant mixture, may be employed if desired. In connection with the reaction mixture employed, it may be pointed out that it is desirable to use a reaction mixture containing considerably more hydrogen than carbon monoxide, a mixture containing 2 volumes of hydrogen for each volume of carbon monoxide being especially suitable.

It is advantageous to employ a relatively high rate of gas flow without, however, unduly decreasing the time of contact between the gas and catalyst. For example, the catalyst may be so disposed that the gas has to traverse a relatively long path in contact therewith. For instance a catalyst mass, comprising the catalyst deposited on its carrier, may be disposed in tubes or the like of relatively small cross-section so that the desired volume of catalyst mass occupies a considerable length of the tubes. Alternatively the catalyst mass can be arranged in wider tubes or other apparatus, a considerable proportion of the interior volume of which is taken up by cooling tubes, preferably running longitudinally. On the other hand, the apparatus may contain means, such as baffles or the like, for ensuring that the gases travel along a relatively long path in contact with the catalyst mass.

If desired the gas mixture may be subjected repeatedly to the reaction conditions either by passing it through a number of reaction zones or by recycling it through a single reaction zone. Between the successive passages or between successive cycles in a recycling process normally liquid hydrocarbons may be condensed out of the gas mixture. If desired, a certain proportion of such normally liquid hydrocarbons may be allowed to remain in the gas mixture or may be returned thereto to act as diluent. When a recycling or other repeated process is employed, it is advisable to keep the initial content of difficultly removable diluents, e. g. nitrogen, as low as possible, since otherwise they tend to attain an undesirably high concentration.

The following example illustrates the process of the invention:

Example

A catalyst mass is prepared as follows: 10 parts by weight of metallic cobalt and 1 part of copper are dissolved in slightly more than the theoretical quantity of 50% nitric acid, after which 2.5 parts of thorium nitrate

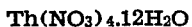

$$Th(NO_3)_4 . 12H_2O$$

are added to the solution which is then diluted sufficiently to form a thin cream when 225 parts of kieselguhr are added. To the well stirred cream thus formed there is added sufficient sodium carbonate to precipitate the catalyst metals present in the form of their carbonates, the precipitate with the kieselguhr being filtered, washed free from nitrate and pelleted.

The pellets are reduced in a current of hydrogen at 300°–350° C. and then charged into a reaction vessel fitted with cooling tubes, the transfer from reduction chamber to reaction vessel being performed in an inert atmosphere, e. g. carbon dioxide. The reaction vessel is raised to a temperature of 195° C. and a current of carbon monoxide and hydrogen in the proportions of 1:2 is passed through. Liquid aliphatic hydrocarbons are condensed from the issuing gases which, after the addition of fresh carbon monoxide and hydrogen, are recirculated over the catalyst.

Having described my invention, what I desire to secure by Letters Patent is:

Process for the production of aliphatic hydrocarbons, which comprises subjecting carbon monoxide and hydrogen in a proportion of 1 to 2 to reaction in the presence of a catalyst, comprising cobalt together with minor proportions of thoria and copper, supported on kieselguhr a carrier under a pressure not substantially above atmospheric and at a temperature of 195° C., the amount of kieselguhr employed being equal to 20 to 30 times the weight of the catalytically active material carried thereon.

HENRY DREYFUS.